(12) United States Patent
Loic

(10) Patent No.: US 9,060,212 B2
(45) Date of Patent: Jun. 16, 2015

(54) IKT UNIVERSAL ELECTRONIC MONITORING DEVICE AND METHOD OF USE FOR SMART COOKING

(76) Inventor: Mucha Loic, Hong Kong (HK)

(*) Notice: Subject to any disclaimer, the term of this patent is extended or adjusted under 35 U.S.C. 154(b) by 599 days.

(21) Appl. No.: 13/421,783

(22) Filed: Mar. 15, 2012

(65) Prior Publication Data

US 2013/0241743 A1    Sep. 19, 2013

(51) Int. Cl.
| | |
|---|---|
| G08B 23/00 | (2006.01) |
| G08C 19/12 | (2006.01) |
| G08B 13/08 | (2006.01) |
| G08B 17/06 | (2006.01) |
| H04Q 3/00 | (2006.01) |
| H04B 5/00 | (2006.01) |
| H04B 7/00 | (2006.01) |
| H04Q 9/00 | (2006.01) |

(52) U.S. Cl.
CPC ............. *H04Q 9/00* (2013.01); *H04Q 2209/43* (2013.01); *H04Q 2209/84* (2013.01)

(58) Field of Classification Search
CPC .................................. G08B 21/00; H04Q 7/22
USPC ....................................................... 340/10.41
See application file for complete search history.

(56) References Cited

U.S. PATENT DOCUMENTS

| | | | |
|---|---|---|---|
| 6,698,923 | B2 | 3/2004 | Bedetti et al. |
| 6,850,861 | B1 | 2/2005 | Faiola et al. |
| 7,722,248 | B1 | 5/2010 | Chapman et al. |
| 2005/0075954 | A1* | 4/2005 | Matsumoto et al. ............ 705/28 |
| 2005/0181785 | A1* | 8/2005 | Chen et al. .................... 455/428 |
| 2006/0020225 | A1* | 1/2006 | Gerber et al. ................. 600/561 |
| 2006/0202848 | A1* | 9/2006 | Volodarsky .................... 340/654 |
| 2007/0061866 | A1* | 3/2007 | O'Toole ............................ 726/2 |
| 2009/0009287 | A1 | 1/2009 | Falcioni et al. |
| 2009/0187280 | A1* | 7/2009 | Hsu et al. ...................... 700/275 |
| 2010/0066556 | A1* | 3/2010 | Chishima et al. .......... 340/686.1 |
| 2010/0156645 | A1 | 6/2010 | Beck |
| 2011/0154363 | A1* | 6/2011 | Karmarkar .................... 719/313 |
| 2013/0228662 | A1* | 9/2013 | Green ........................ 248/229.1 |
| 2013/0271182 | A1* | 10/2013 | Buttolo et al. .................. 327/14 |

* cited by examiner

*Primary Examiner* — Jennifer Mehmood
*Assistant Examiner* — Pameshanand Mahase
(74) *Attorney, Agent, or Firm* — Andrew Alia, Esq.

(57) ABSTRACT

A universal iKT electronic monitoring device, system and method of use, to receive data from a variety of types of sensors (e.g. measuring weight, temperature) housed within apparatuses (e.g. a kitchen appliances, utensils) that are electronically compatible with the monitoring device. The monitoring device then wirelessly transmits the sensor data to a User's mobile device (i.e. a smartphone) to be analyzed and stored. The User's mobile device also comprises software to assist in using the apparatus, such as listing recipes, or transmitting commands to the device to turn off an apparatus (e.g. oven). One iKT device is compatible for use with a multitude of electronic apparatuses, such as mixing bowls to measure the weight of cooking ingredients, spatulas and oven mats to measure food temperature, cups to measure liquid volumes, and oven controls to turn off/on or reduce the temperature.

15 Claims, 20 Drawing Sheets

| PRODUCT NAME | PIC. | iFUNCTION | SENSOROUT |
|---|---|---|---|
| PREPARATION TOOLS | | | |
| MIXING BOWL | | MEASURE WEIGHT OF FOOD INSIDE | WEIGHT |
| CUTTING BOARD | | MEASURING WEIGHT OF FOOD ON TOP | WEIGHT |
| COCKTAIL SHAKER | | MEASURING WEIGHT/VOLUME OF LIQUID INSIDE | WEIGHT |
| SAUSE SHAKER | | MEASURING WEIGHT/VOLUME OF LIQUID INSIDE | WEIGHT |
| MEASURING JUG | | MEASURING WEIGHT/VOLUME OF FOOD/LIQUID INSIDE | WEIGHT |
| MEASURING SPOONS | | MEASURING WEIGHT/VOLUME OF FOOD/LIQUID INSIDE | WEIGHT |
| MEASURING CUPS | | | WEIGHT |
| ROLLING PIN | | UTILIZATION TIPS AND RECIPES | N/A |

Fig. 3A

| PRODUCT NAME | PIC. | iFUNCTION | SENSOROUT |
|---|---|---|---|
| OVEN TOOLS | | | |
| SILICONE MAT |  | MEASURE TEMPERATURE INSIDE OVEN | TEMPERATURE |
| CAKE MOLD |  | MEASURE TEMPERATURE INSIDE OVEN | TEMPERATURE |
| POPUP TIMER | | MEASURE TEMPERATURE INSIDE OVEN | TEMPERATURE |

| PRODUCT NAME | PIC. | iFUNCTION | SENSOROUT |
|---|---|---|---|
| GADGETS | | | |
| PIZZA CUTTER | | UTILIZATION TIPS AND RECIPES | N/A |
| CHEESE GRATER | | UTILIZATION TIPS AND RECIPES | N/A |
| MEASURING JUG | | UTILIZATION TIPS AND RECIPES | N/A |
| PEELER | | UTILIZATION TIPS AND RECIPES | N/A |
| WHISK | | UTILIZATION TIPS AND RECIPES | N/A |

Fig. 3C

| PRODUCT NAME | PIC. | iFUNCTION | SENSOROUT |
|---|---|---|---|
| TOOLS | | | |
| SPATULA | | MEASURE TEMPERATURE OF FOOD IN CONTACT WITH | TEMPERATURE |
| TURNER |  | | |
| SLOTTED SPOON | | | |
| BASTING SPOON |  | | |
| LADLE |  | | |
| BRUSH | | | |
| MINISLOTTED TURNER |  | | |

| PRODUCT NAME | PIC. | iFUNCTION | SENSOROUT |
|---|---|---|---|
| CONSERVATION | | | |
| FOOD CONTAINER |  | KEEP TRACK OF FOOD CONSERVATION LIMIT / QTY / TYPE CONTAINS INSIDE | ID# |
| ICE CUBE TRAY | | MEASURE TEMPERATURE INSIDE THE FREEZER | TEMPERATURE |

| PRODUCT NAME | iFUNCTION | SENSOROUT | CONTROL IN |
|---|---|---|---|
| APPLIANCES | | | |
| COFFEE MAKER | UTILIZATION TIPS AND RECIPES | N/A | TIMER |
| OVEN | MEASURES TEMPERATURE | TEMPERATURE | TEMPERATURE |
| FRIDGE | MEASURES TEMPERATURE | TEMPERATURE | TEMPERATURE |
| PREPARATION ROBOT | UTILIZATION TIPS AND RECIPES | TEMPERATURE | TIMER |

Fig. 3F

IKT UNIVERSAL ELECTRONIC MONITORING DEVICE AND METHOD OF USE FOR SMART COOKING

FIELD OF THE INVENTION

The present invention relates generally to wireless monitoring systems, and in particular to a wireless monitoring system for household appliances and cooking utensils.

BACKGROUND

There are a multitude of systems available for users to remotely monitor apparatuses, such as household appliances and devices, via wireless transmission of sensor data to a user's computing device. The systems have limitations, though, in their capacity to monitor more than one type of sensor and/or apparatus, and to wireless exchange information in real-time with a remotely located user. They also require the apparatuses that are housing the sensor to include electronic components for analyzing the sensor data before wirelessly transmitting it. This requires extra costs in the production of the apparatuses with sensors. And, in most cases, the systems can only transmit sensor data to a user's computing device, but they are not enabled to receive commands from the user's computing device to control the operation of the apparatus.

For example, the U.S. Pat. No. 7,722,248 entitled "Wireless Remote Cooking Thermometer System" discloses a system comprising a temperature probe connected via a cable to a radio frequency (RF) transmitter device for sending temperature data wirelessly to a second RF receiver unit. The RF transmitter is unable to process data from any sensor type other than a temperature sensor. The system also has limited capacities because the second unit (i.e. a user's computing device) is only able to receive sensor data, but not to transmit control commands to the first unit, such as to turn off the oven.

Therefore, there is a need for a device that wirelessly exchanges information with a user's computing device comprising sensor data and control commands for monitoring of a wide variety of apparatuses. Only one device would be required to monitor a multitude of sensors types housed within different apparatuses, such as temperature and weight sensors for cooking, humidity and barometric pressure for weather conditions, water sprinkler on/off controls for lawn maintenance, and so forth. And, the apparatuses should not be required to house additional electronic components to analyze the sensor data, as this is accomplished by a software application on the user's computing device.

SUMMARY

The present invention comprises a universal iKT electronic monitoring device, system and method of use, to receive data from a variety of types of sensors (e.g. measuring weight, temperature) housed within apparatuses (e.g. a kitchen appliances, utensils) that are electronically compatible with the monitoring device. The monitoring device then wirelessly transmits the sensor data to a User's mobile device (i.e. a smartphone), which comprises an application or software to assist in analyzing the data.

The application/software may also display information and instructions to assist the User in utilizing the apparatus, such as cooking recipes. And, the present invention also comprises the ability for the User to transmit commands using the application/software on their communications device to transmit a signal to the monitoring device to control some types of apparatuses, such as ovens, irons, and coffee pots. For example, the User's device can send a signal to the apparatus (e.g. oven) via the monitoring device to change the operating state of the apparatus (e.g. turn off an oven).

In a preferred embodiment, the wireless communication between the monitoring device and the User's electronic communications device is via Bluetooth® technology, but other wireless means are within the scope of this invention. In other embodiments, the monitoring device may also wirelessly communicate with the apparatus and the User's electronic communications device.

The monitoring device is "universal" in that it may be utilized with a wide variety of electronic apparatuses comprising a variety of types of sensors that can transmit and receive data from the monitoring device's microcontroller. The apparatuses may be "compatible" with the monitoring device by completing an electrical circuit when the monitoring device is inserted into the apparatus, and directly sending data through the circuit to the wireless unit (i.e. Bluetooth® chip) within the monitoring device, which subsequently wirelessly transmits the data to the User's communications device. Therefore, one iKT monitoring device is compatible for use with any apparatus comprising electronic components compatible with the monitoring device: such as with a multitude of kitchen utensils (i.e. mixing bowls to measure the weight of ingredients, spatulas and oven mats to measure food temperature, cups to measure liquid volumes, etc. . . . ), lawn equipment (i.e. sprinkler systems), home alarm systems (e.g. fire, locks).

The apparatuses may also be "non-compatible", but wirelessly enabled so as to transmit sensor data to the wireless unit in the monitoring device, which subsequently transmits it to the User's electronic communications device. Therefore, the universal electronic monitoring device can be used with a variety of electronic products comprising sensors and User interfaces to display the sensor data. By pairing the universal device with the electronic product, the product would no longer require electronic components to analyze the sensor output or a separate monitor to display it. The universal device and the User's electronic communications device would provide this function.

The method of use of the universal electronic monitoring device with compatible apparatuses comprises transmitting sensor data from an electronic apparatus to the microcontroller housed within the monitoring device. The microcontroller analyses the sensor data and then electronically transmits the data to the monitoring device's wireless transmission chip (e.g. a Bluetooth® chip), which subsequently wirelessly transmits the data to the User's electronic communications devices that are paired with the monitoring device. Alternatively, the microcontroller converts the sensor data (analog-to-digital) for transmission by the wireless transmitter to the User's electronic communications device, where a software application will analyze the sensor data.

The method of use of the universal electronic monitoring device with non-compatible apparatuses comprises wirelessly transmitting sensor data from the electronic apparatus to the microcontroller housed within the monitoring device. The microcontroller analyzes the sensor data and then electronically transmits the data to the monitoring device's via wireless transmission means (e.g. a Bluetooth® chip). The transmission means then wirelessly transmits the sensor data to the User's electronic communications device, thus bypassing the apparatus's electronic circuits for analyzing the sensors and the User interface to view the data. Alternatively, the microcontroller converts the sensor data (analog-to-digital) for transmission by the wireless transmitter to the User's electronic communications device, where a software application will analyze the sensor data.

In a particular embodiment, the universal electronic monitoring device is used to assist in the preparation of a meal. The monitoring device receives data from sensors housed within kitchen appliances and utensils to monitor parameters involved in cooking, such as the temperature, weight, and volume of solid and liquid food and recipe ingredients. The monitoring device wirelessly transmits the sensor data to User's electronic communications device. The User need not be in the immediate vicinity of the appliance or utensil to receive the data, but may instead be located at a distance, such as in a separate room of a home and still monitor, for example, the temperature in an oven.

The universal electronic monitoring device also has the ability to wirelessly communicate with a variety of types of sensors housed within a variety of types of kitchen appliances and utensils. For example, the User can utilize one monitoring device to receive sensor data throughout the process of cooking a meal using different appliances and utensils: from weighing the ingredients in a mixing bowl; measuring the volume of a liquid in a measuring cup; and monitoring the temperature inside an oven or on a skillet cooking surface. And because the monitoring device is "universal", then the User merely moves the monitoring device from one appliance and utensil to the next while preparing the food by merely removing and inserting the monitoring device into the measuring cup, then the mixing bowl, then the spatula/turner, and then the oven.

The present invention may also comprise a method of use of the User's electronic communications device to transmit commands for controlling electronic apparatuses, such as kitchen appliances and automated utensils. In some cases, the User may transmit commands to the sensors by wirelessly transmitting the command from the User's electronic communications device to the universal electronic monitoring device that subsequently transmits it to the sensors in the appliance and utensil. For example, the monitoring device can be used to remotely reduce the temperature of a kitchen oven, turn on/off a coffee pot, and/or reduce the speed on a mixer or blender.

The universal electronic monitoring device comprises the following components: a) a switching means for triggering the monitoring device in the vicinity of sensors housed within an apparatus; a read and write memory; a microcontroller to process the sensor and memory data; a means to connect to sensors and transmit raw data to the microcontroller; a means to wirelessly transmit processed data from the microcontroller to the User's electronic communications device; a means to power and recharge the device, wherein monitoring said device is compatible with two or more apparatuses.

In a particular embodiment of the present invention, the universal electronic monitoring device dimensions are 20 by 40 by 10 millimeters and comprise the following components: 1) a Bluetooth® chip (V2.1 or later) for transmitting and receiving data to surrounding Bluetooth® enabled User's electronic communications devices: 2) a magnetic switch that triggers the monitoring device's electronic circuit when placed in close contact with a magnet located on the appliance/utensil/device; 3) a battery microchip measuring the monitoring device's power level that is displayed on the outside of the device; 4) a microcontroller for transmitting and receiving data between the sensors and the Bluetooth® chip; 5) a USB connector to recharge the battery; 6) a light emitting diode (LED) viewable on the outside of the monitoring device to indicate the circuit state; 7) a 10 pin connector on the back of the monitoring device for connecting with the sensors; 8) a 3.3 volt battery empowering the circuit; and 9) EEPROM to read and write sensor data memory. The microcontroller (4): a) receives information from the sensors located in the compatible apparatus (i.e. appliance/utensil/device) and from the EEPROM, and subsequently sends the data to the Bluetooth® chip; and/or b) receives information from the Bluetooth® chip, processes and sends it to the compatible apparatus.

The universal electronic monitoring device is beneficial for use in a variety of situations. For example, the device is useful for events requiring precise control of electronic apparatuses, such as cooking difficult recipes. The monitoring device is also suitable for use by individuals with physical impairments, such as vision and mobility, to assist them in controlling electronic apparatuses. And it is also useful for individuals whose attention is diverted to other tasks (i.e. watching infants), or who are located in rooms other than where the apparatuses are located.

The present invention also comprises an electronic communications device application (i.e. mobile application) for use in receiving, transmitting, and viewing commands and data between the User's electronic communications device and the monitoring device. The User's device may also comprise the ability to emit audio messages from the monitoring device, such as for visually impaired Users.

BRIEF DESCRIPTION OF THE DRAWINGS

The iKT device and methods of use that embody the above and other inventive features will now be described with reference to the following drawings.

DETAILED DESCRIPTION

The following definitions and methods are provided to better define the present invention and to guide those of ordinary skill in the art in the practice of the present invention. Unless otherwise noted, terms are to be understood according to conventional usage by those of ordinary skill in the relevant art.

As used herein, the term "universal electronic monitoring device" refers to a device comprising an electronic circuit enabled to receive and/or transmit data to a compatible apparatus, and transmit the data wirelessly to a User's electronic communications device.

As used herein, the term "compatible apparatus" refers to a device comprising a sensor, EEPROM chip, and a controller that performs a task that a User wishes to monitor remotely and/or to detect conditions to assist the User in effectively using the apparatus. The apparatus may further comprise a unique identification to permit the universal electronic monitoring device in identifying the apparatus as being compatible.

As used herein, the term "electronic communications device" refers to a computing device comprising wireless communications capabilities, such as Bluetooth® technology, for receiving data from the monitoring device comprising sensor data, and information regarding the use of the apparatus; and/or for transmitting commands to the monitoring device to control the apparatuses activity (i.e. on/off). Examples of User electronic communications devices comprise laptops, desktops, smartphones, and tablets.

As used herein, the term "sensor unit" refers to the electrical circuit housed within the apparatus (e.g. cooking oven) that enables transmission of sensor data to the monitoring device, as well as receipt and execution of commands from the User's electronic communications device (e.g. turn off oven).

System Architecture

Figure 1:
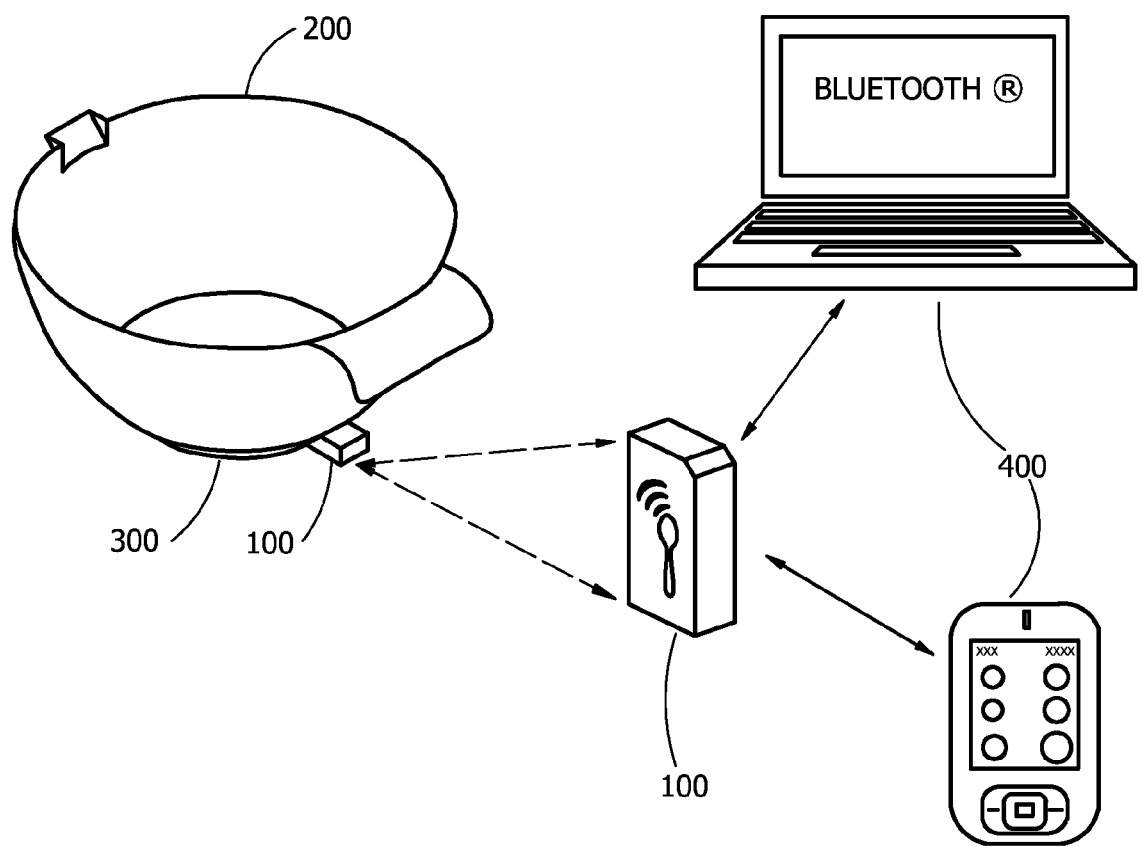
FIG. 1 is an illustration of the system of the universal electronic monitoring device transmitting sensor data (i.e. weight) from a bowl to a User's electronic communications device (i.e. smartphone and/or laptop).

The system of the present invention comprises: a universal electronic monitoring device (100) (i.e. iKT); an apparatus compatible with the monitoring device (200) and housing a sensor within the apparatus (300); and a User's electronic communication device (400) for receiving sensor data via wireless transmissions. FIG. 1 is an illustration of the system of the universal electronic monitoring device (100) transmitting sensor data (i.e. weight) from a cooking mixing bowl (200) to a User's electronic communications device (i.e. smartphone and/or laptop) (400), wherein the sensor unit (300) is located in the base of the bowl.

A User's electronic communications device (400) has a secondary memory device, such as, for example, a hard disk drive or other non-volatile memory, for storing sensor data and User information, such as lists of recipes and apparatus operating instructions. Device (400) also comprises a graphical interface user for displaying apparatus information, such as temperatures, weights and instructions.

The system also comprises an electronic communications device application or software (i.e. mobile application) for use in receiving, transmitting, and viewing commands and data between the User's electronic communications device and the monitoring device, and for analyzing the sensor data. The application or software comprise a computer readable medium containing computer executable instructions to carry out the methods of receiving and storing sensor data, and methods of transmitting apparatus operating commands (e.g. turn on/off); and methods of displaying User information, such as recipes, in accordance with the present invention. The computer executable instructions are adapted for execution by a hardware element, such as a processor, wherein the instruction comprise commands that when executed cause the processor to perform a corresponding set of commands, such as receive and analyze sensor data, and transmit apparatus operating commands. The software may be written or coded using a programming language, and stored using any type of computer-readable media or machine-readable media well known in the art. Examples of software in the present invention comprise any software components, programs, applications, computer programs, application programs, system programs, machine programs, and operating system software.

The User's device may also comprise the software to emit audio messages from the universal monitoring device, such as sensor data—temperature, weight, etc., and to receive and transmit audio messages from the User to the device—such as "turn off the oven". The software would be used, for example, by Users with a visual impairment. Software for assisting visually impaired individuals in using their mobile devices are readily known, such as Siri and Voiceover, and could be used in conjunction with the present invention. Or, visual impairment functionality could be incorporated into the software comprising apparatus control and sensor monitoring.

It will be appreciated by one with skill in the art that the application might be installed on the User's device (400) from a number of sources such as, for example, downloaded over the Internet from a server, or bundled with software provided by another software manufacturer (such as a Web browser provided by a Web browser manufacturer). It will be appreciated that the application will function in substantially the same manner regardless of the installation source or method.

Wireless Transmission

Figure 4:
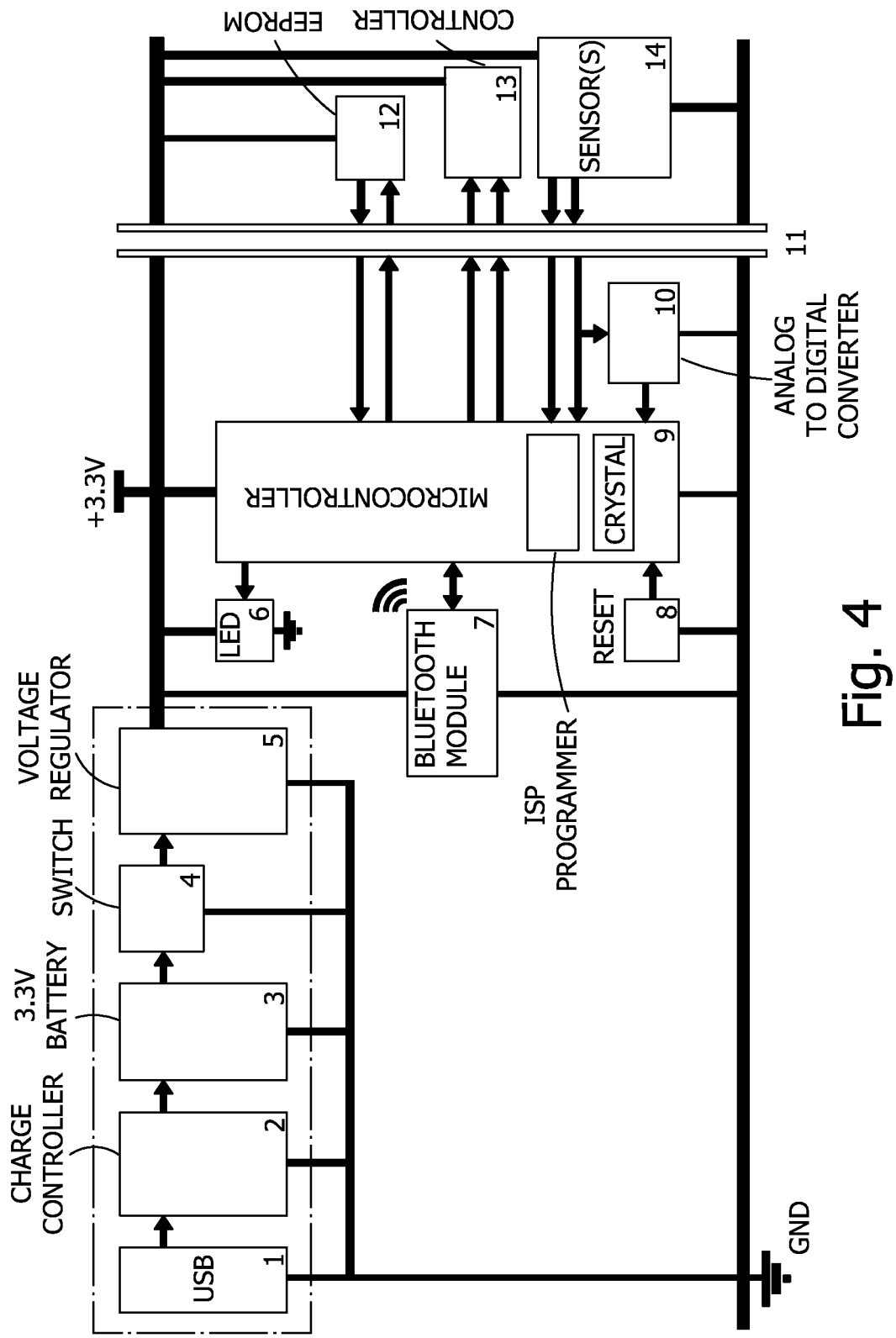
FIGS. 4-6 are different types of illustrations of an exemplified circuit diagram of the universal electronic monitoring device.

Wireless transmission methods include known cable-free methods, for example via infrared, wireless personal area network (WPAN) carried over wireless network technologies such as IrDA, Bluetooth®, Wireless USB, Z-Wave, ZigBee, or even Body Area Network.; or other radio links that comprise a wireless local area network (WLAN) based on the Institute of Electrical and Electronics Engineers' (IEEE) 802.11 standards. In a particularly preferred embodiment, the wireless transmission between the universal electronic monitoring device (iKT device) and the User's electronic communications device (i.e. smartphone) is accomplished via the use of Bluetooth® technology (V2.1-V4.0 or later) (FIG. 4, #7). Bluetooth® electronic communications devices of the present invention comprise computing devices, such as laptops, desktops, tablets, mobile phones, etc., with a Bluetooth® wireless card either built in or added on via USB connector/adapter. Bluetooth® technology allows these computing devices to connect instantly to the Bluetooth® chip within the monitoring device in order to transmit data between the two devices. Additionally, the version of Bluetooth® chip used may alter the power required to be supplied by the battery (3), wherein later versions of Bluetooth®, such as V4.0, require significantly less power.

Sensor Unit

Figure 2:
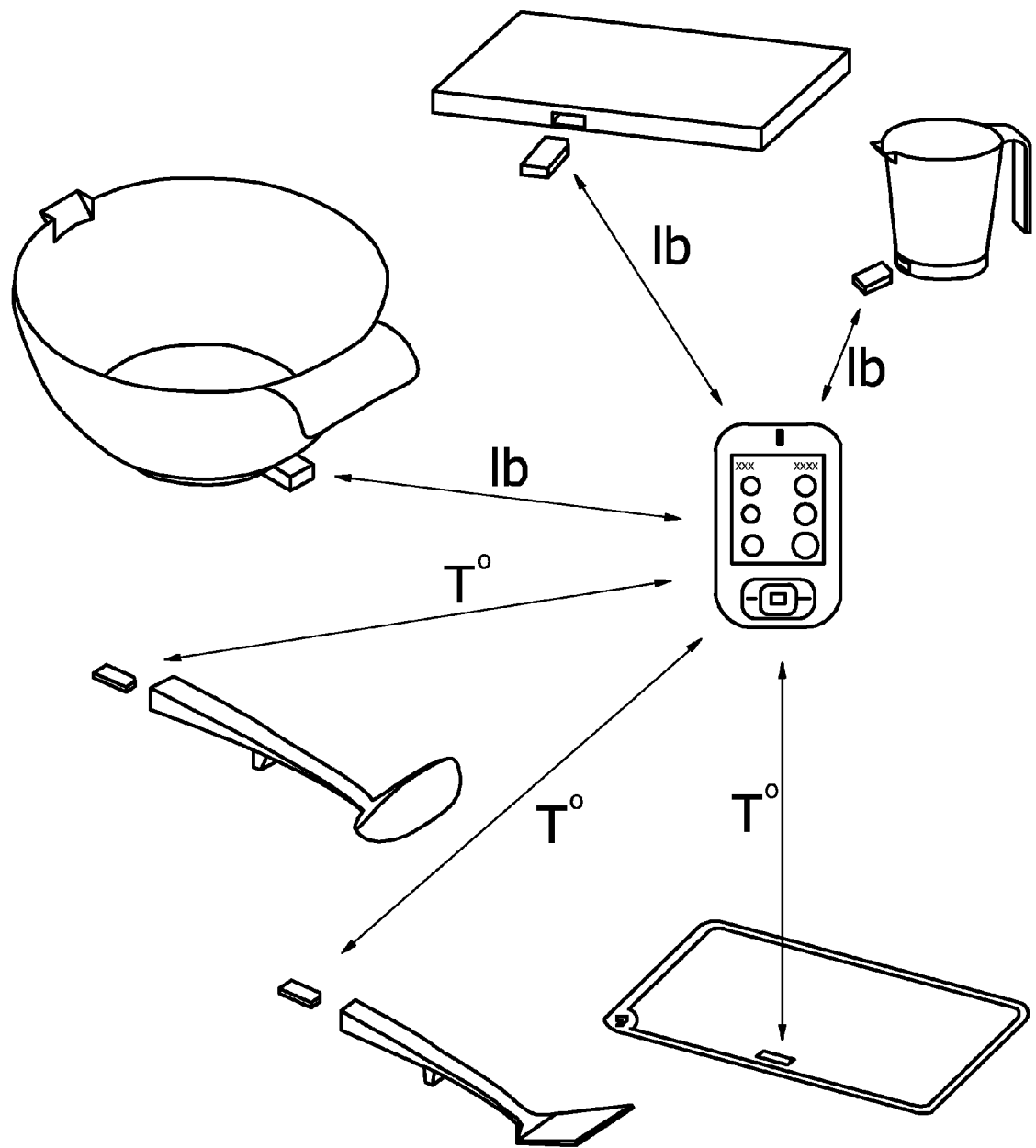
FIG. 2 is an illustration of various compatible apparatuses used in cooking and transmitting sensor data for temperature or weight to a User's electronic communications device.
Figure 3B:
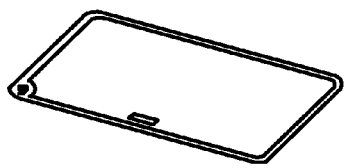
FIG. 3 is a table disclosing numerous compatible apparatuses used in cooking that transmit cooking instructions and recipes, and/or sensor data.
Figure 3B:
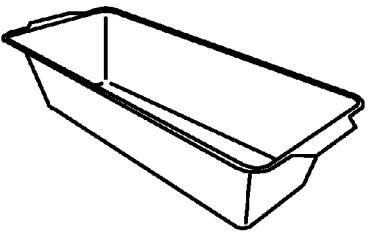
Figure 3D:
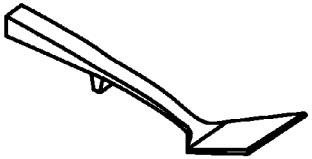
Figure 3D:
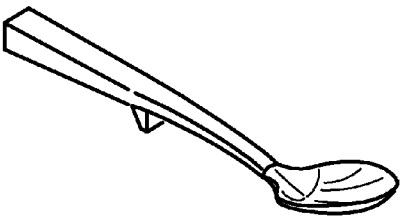
Figure 3D:
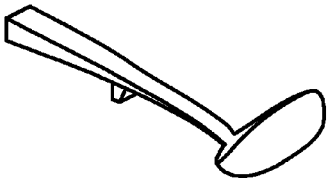
Figure 3D:
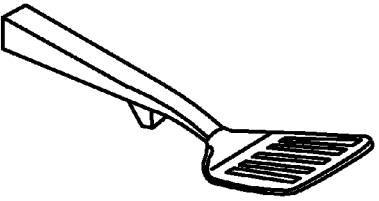
Figure 3E:
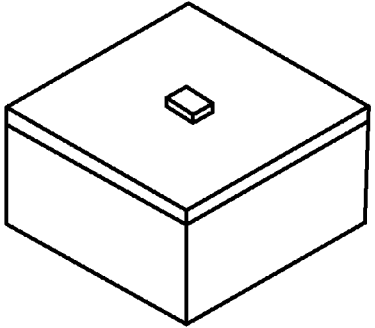

As illustrated in FIG. 2, a variety of compatible apparatuses (200) comprise sensor units (300) that can electronically transmit sensor data to the electronic monitoring device (100) when the device (100) is inserted into the apparatuses (200) so as to complete an electrical circuit. Different apparatuses may house the monitoring devices in different locations within the apparatuses. For example, and as shown in FIGS. 2 and 3 as pertaining to apparatuses compatible for cooking environments, the monitoring device (i.e. box 100) is inserted into the side of a cutting board; the side of the base of a mixing bowl and measuring jag/cup; the middle of the handle of a utensil (i.e. turner, spatula); one end of a rolling pin; and the end of the handle of a pizza cutter.

The sensor units (300) comprise: sensors to monitor conditions within and/or around an apparatus into which it is housed; means to collect and transmit sensor data to the monitoring device (100); means of activating switches located within the universal monitoring device (e.g. such as a magnet to activate a reed switch when the monitoring device is inserted into the apparatus); and a means for sensor data non-volatile memory storage (e.g. Electrically Erasable Programmable Read-Only Memory-EEPROM card). The sensor unit may also comprise a "controller" comprising electronic circuit components to enable a User to control the apparatus by sending commands from the communications device (400). The controller structure depends on the type of apparatus, and it may be different from one apparatus to the next.

Sensors for use in the apparatuses (200) of the present invention are widely known in the art: weight; temperature; air pressure; movement; pressure; gas; contact; sound; etc.

The intended use of the apparatus also determines the type of sensor used for transmission of data to the monitoring device, such as temperature (T°) for a turner/spatula/ladle/oven mat or weight (lb.) for a mixing bowl/measuring jag/cup.

The table in FIG. 3 provides a list of apparatuses (200) for cooking wherein some apparatuses comprise sensors (300) to transmit data of cooking conditions, while other apparatuses signal the User's electronic communications device (400) to display apparatus utilization tips and recipes device's graphical interface. For example, those apparatuses that do not comprise sensors, such as pizza cutters, will still trigger the monitoring device (100) when it is connected to the apparatus (200). A wirelessly transmission will be sent from the monitoring device (100) to the User's electronic communications device (400) to cause the software/application on the device (400) to display utilization tips and recipes associated with the apparatus (200) (e.g. recipes for pizzas). The iKT apparatuses compatible with a iKT monitoring device that house sensors or not comprise: mixing bowls; cutting boards; cocktail shaker; sauce shakers; measuring jugs, spoons, and cups; rolling pins; silicone over mats; cake molds; popup timers; pizza cutters; cheese graters; ice cream scoops; peelers; whisks; spatulas; turners; basting spoons; slotted spoons; ladles; brushes; mini-slotted turner; food container; ice cube tray; coffee makers; ovens; refrigerators; and preparation robots.

Electric Circuit of the Monitoring Device

Figure 5:
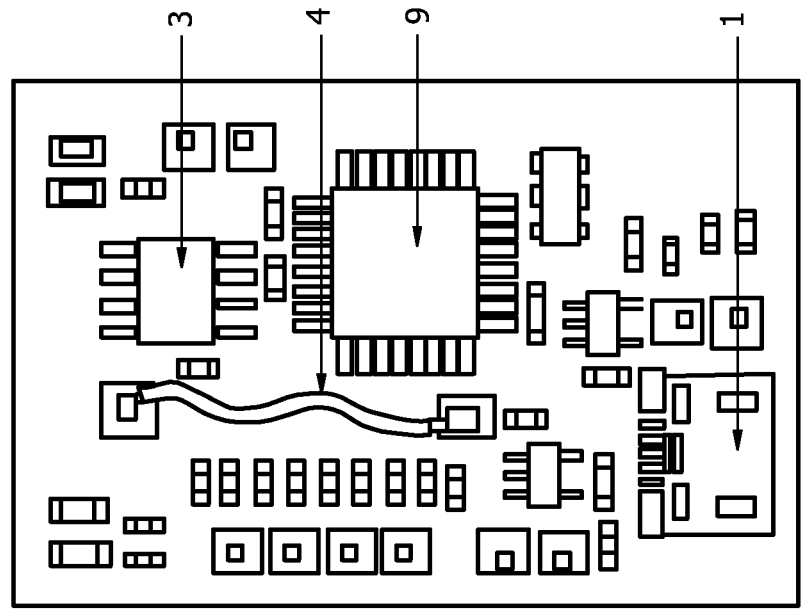
Figure 5:
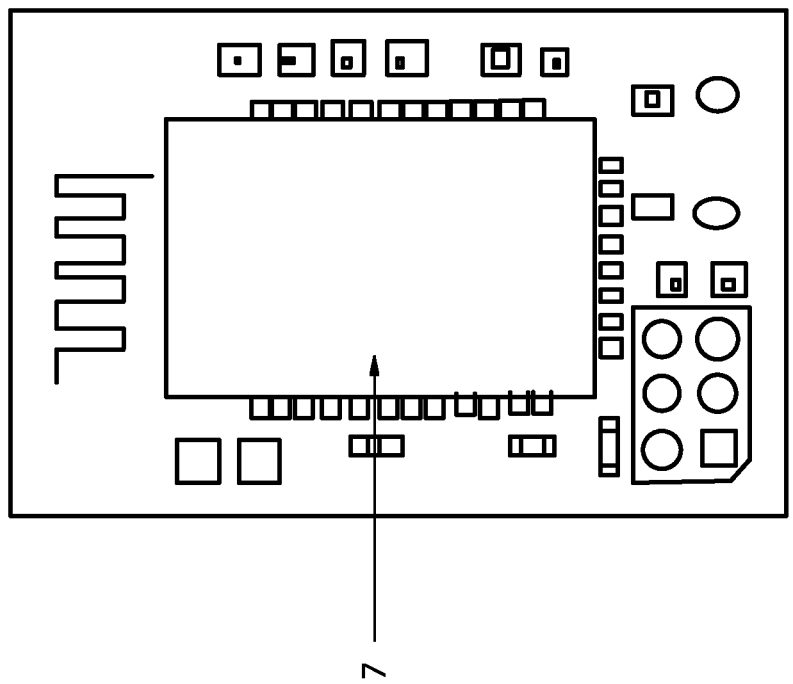
Figure 6A:
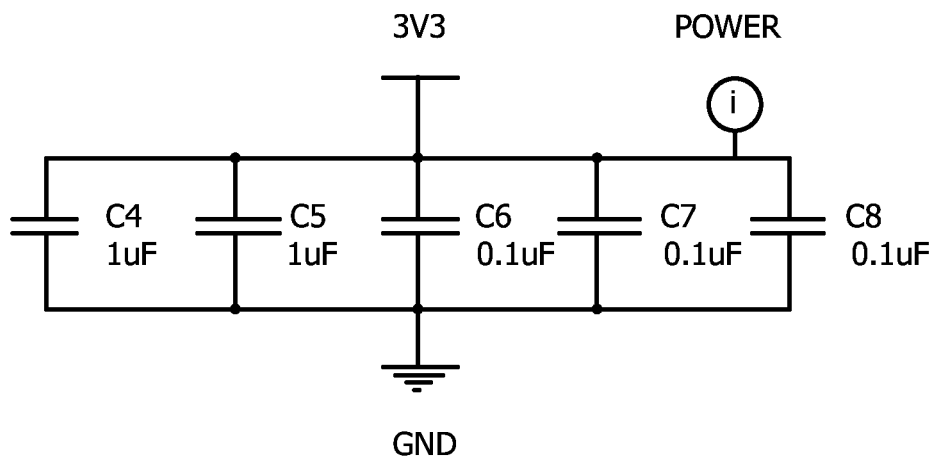
Figure 6B:
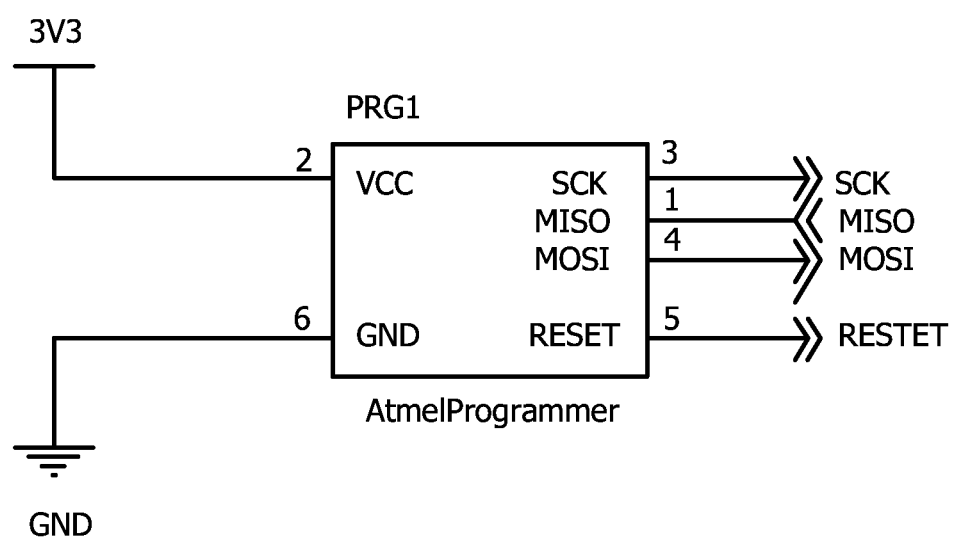
Figure 6C:
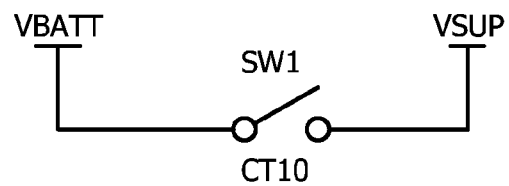
Figure 6D:
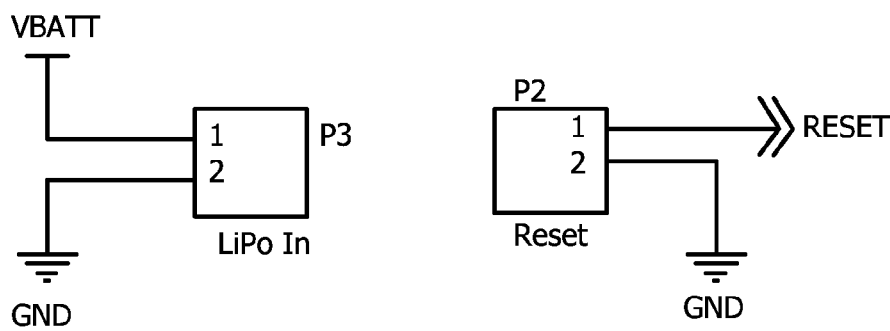
Figure 6E:
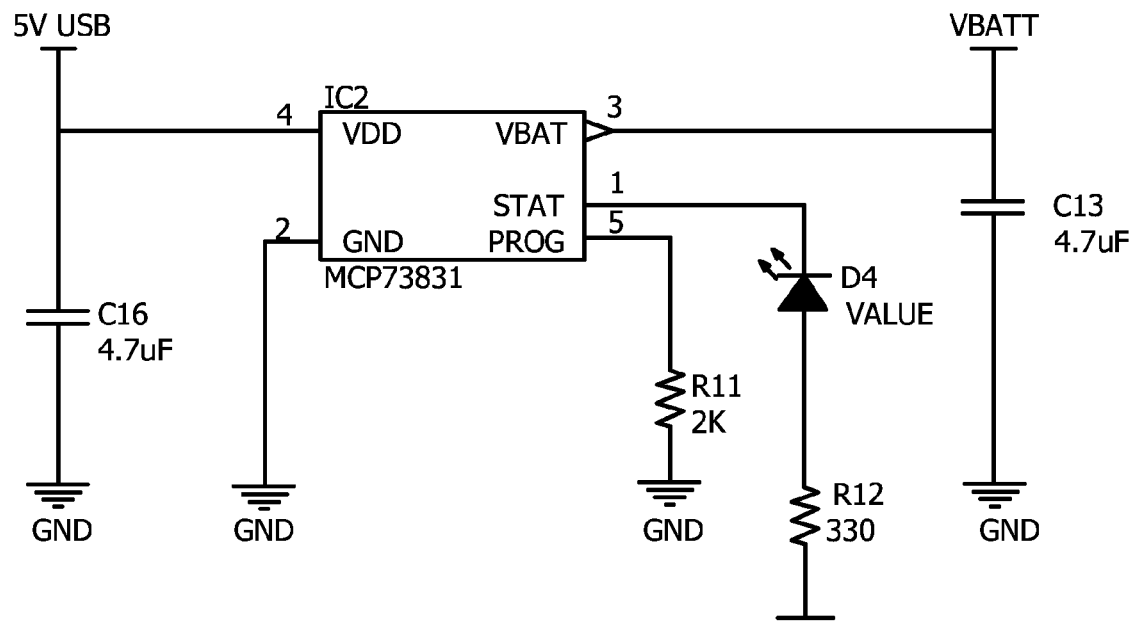
Figure 6F:
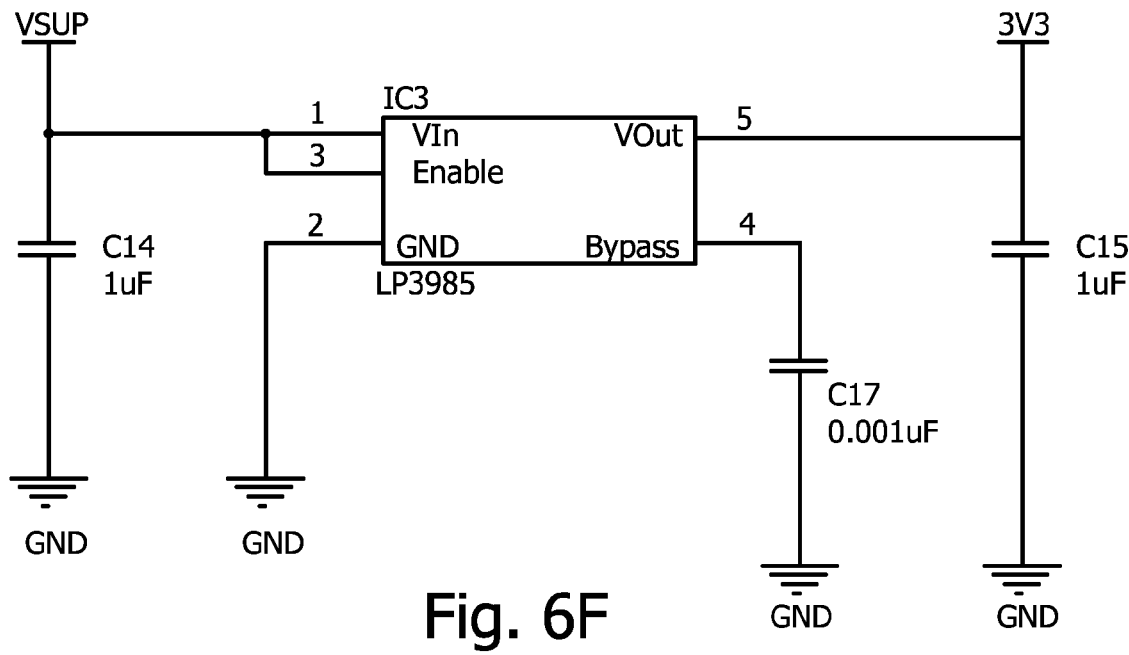
Figure 6G:
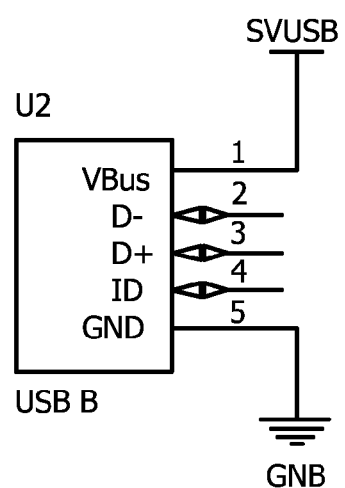
Figure 6H:
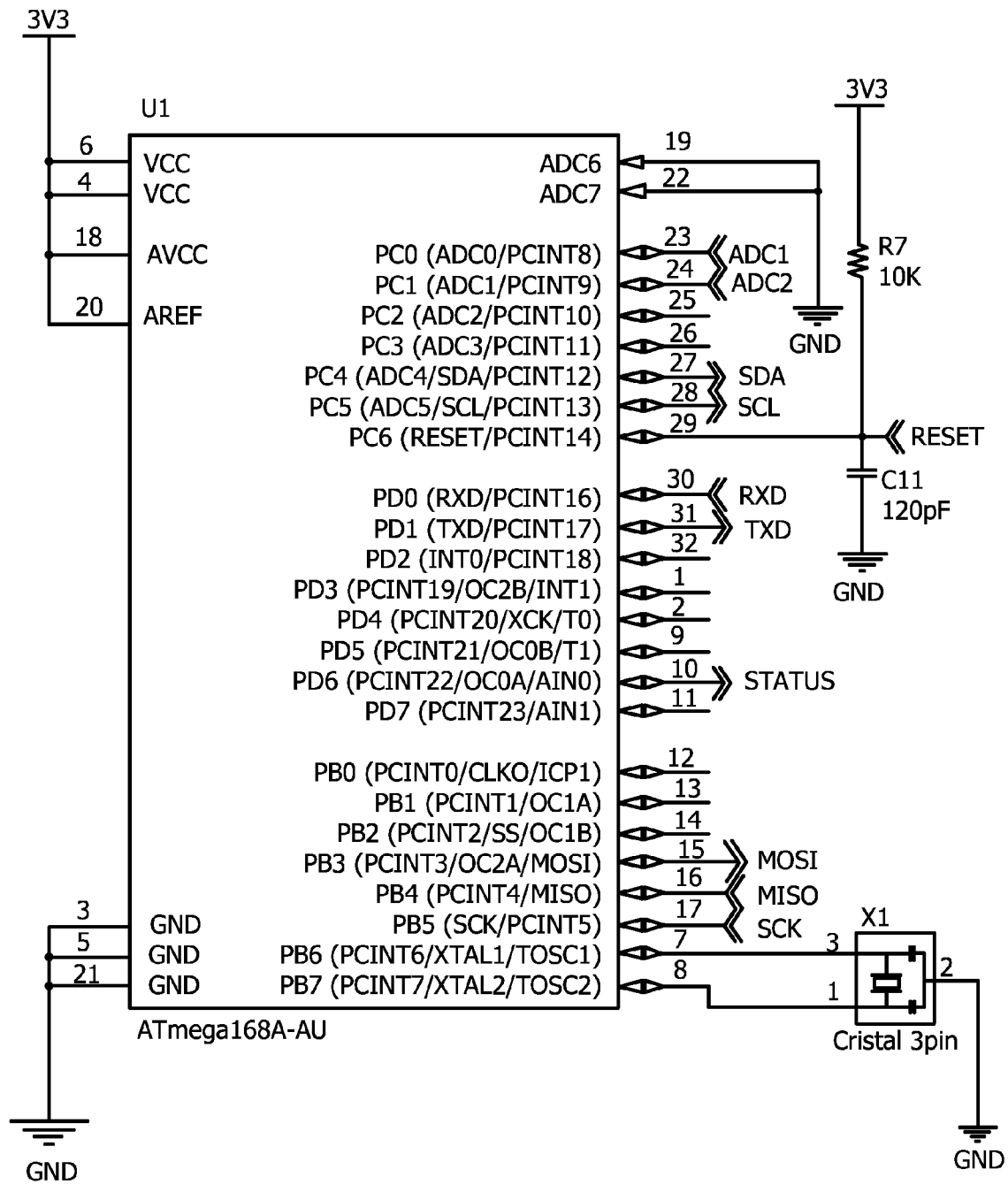
Figure 6J:
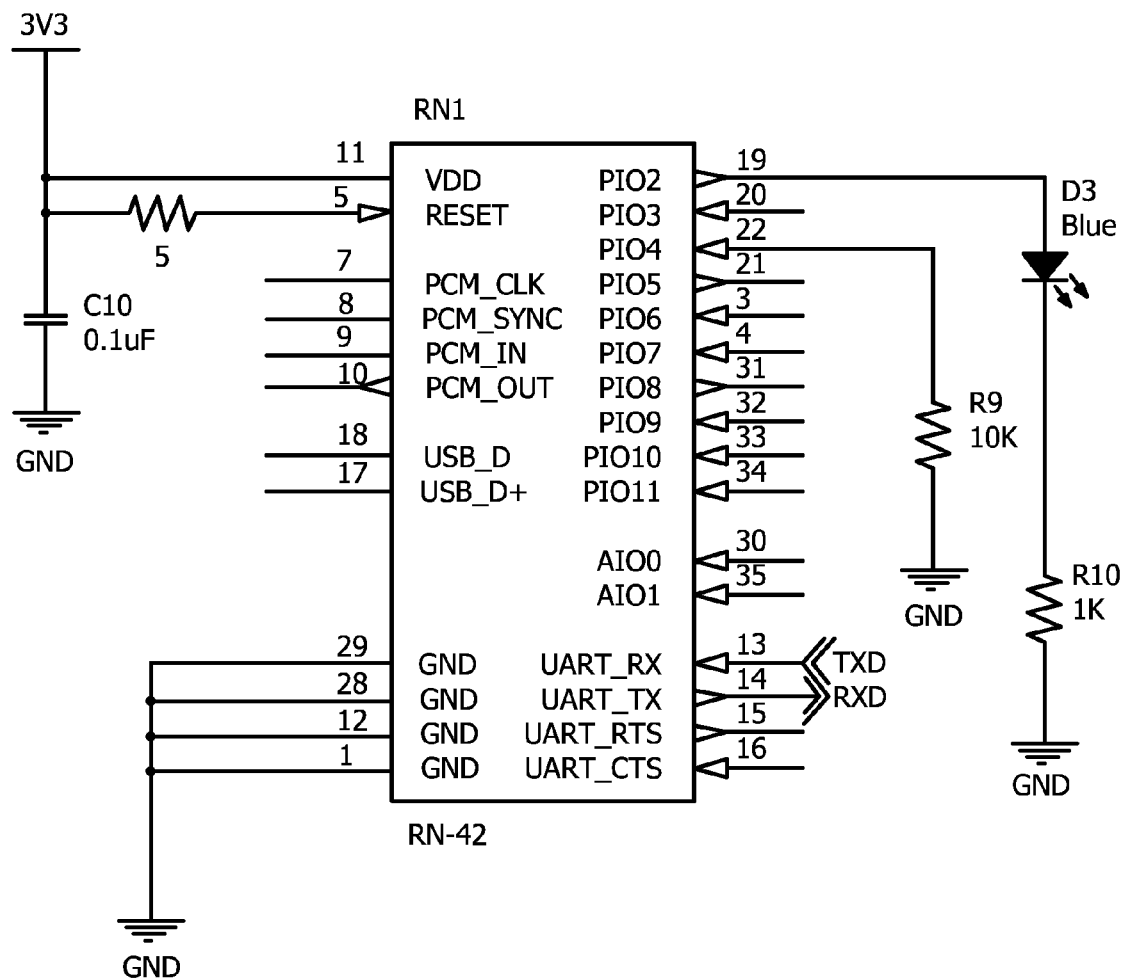
Figure 6K:
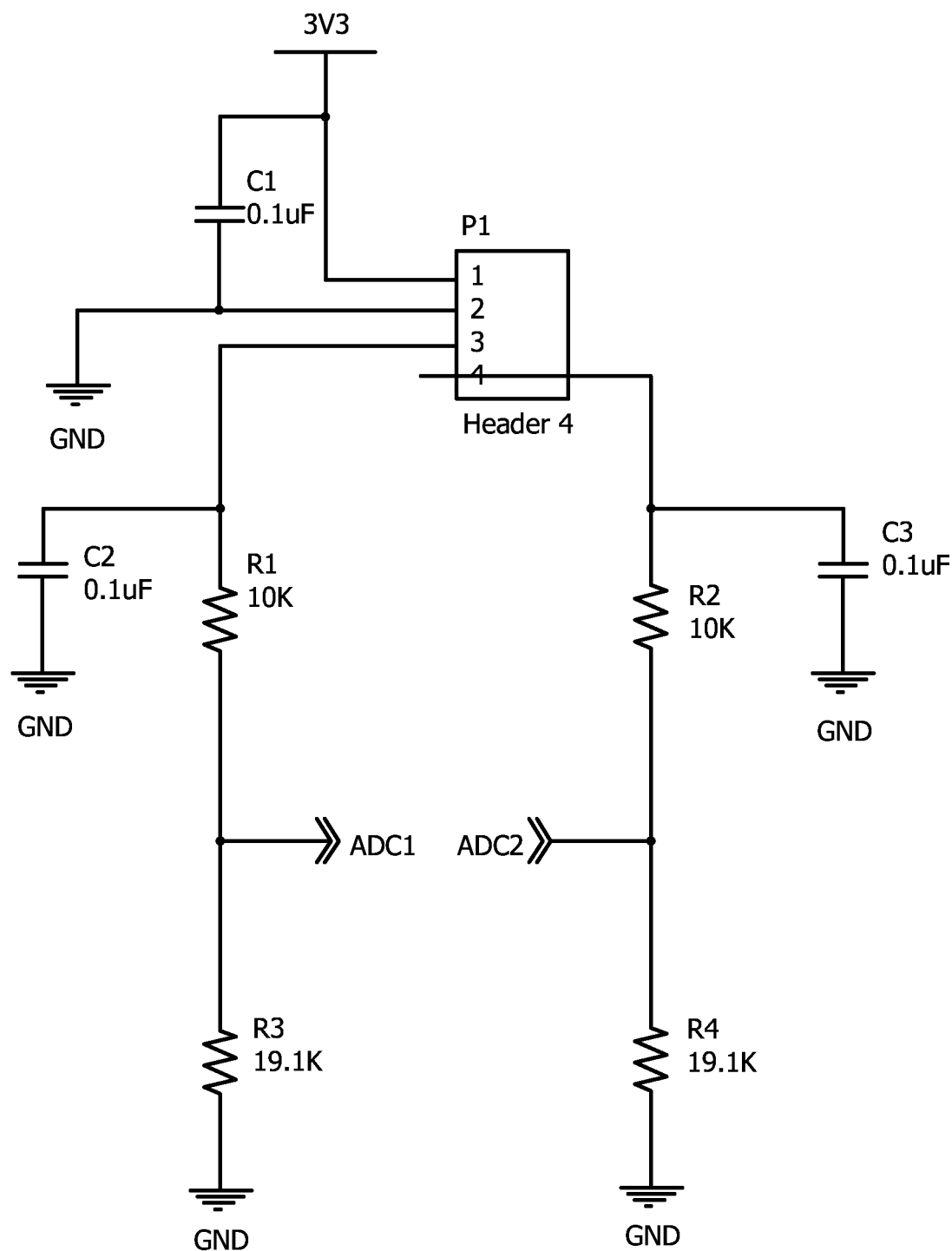
Figure 6L:
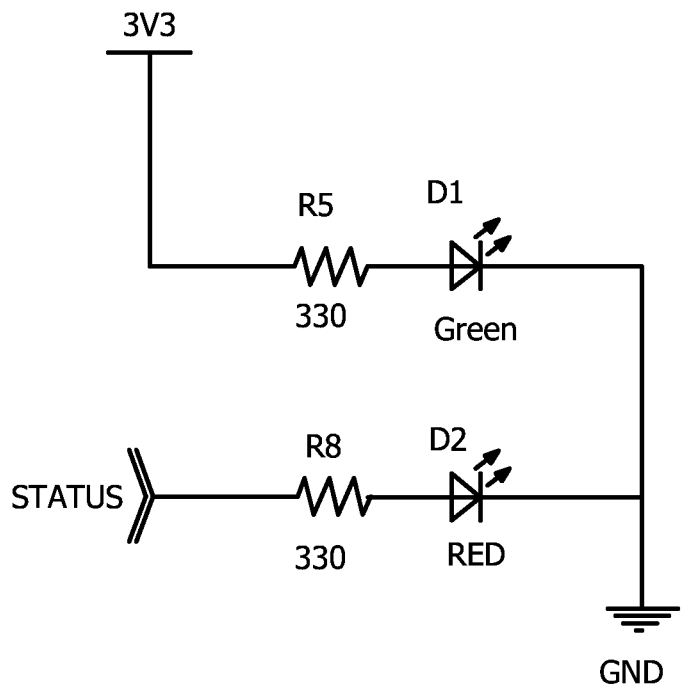
Figure 6M:
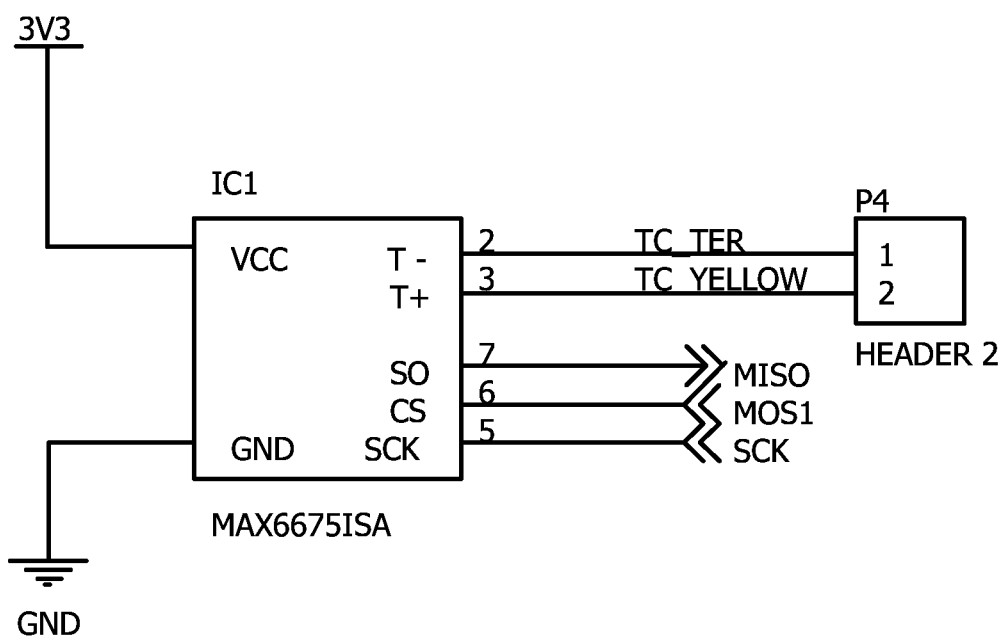

FIGS. 4-6 provide different types of illustrations of an exemplification of the electric circuit housed with the universal electronic monitoring device (100).

Figure 7:
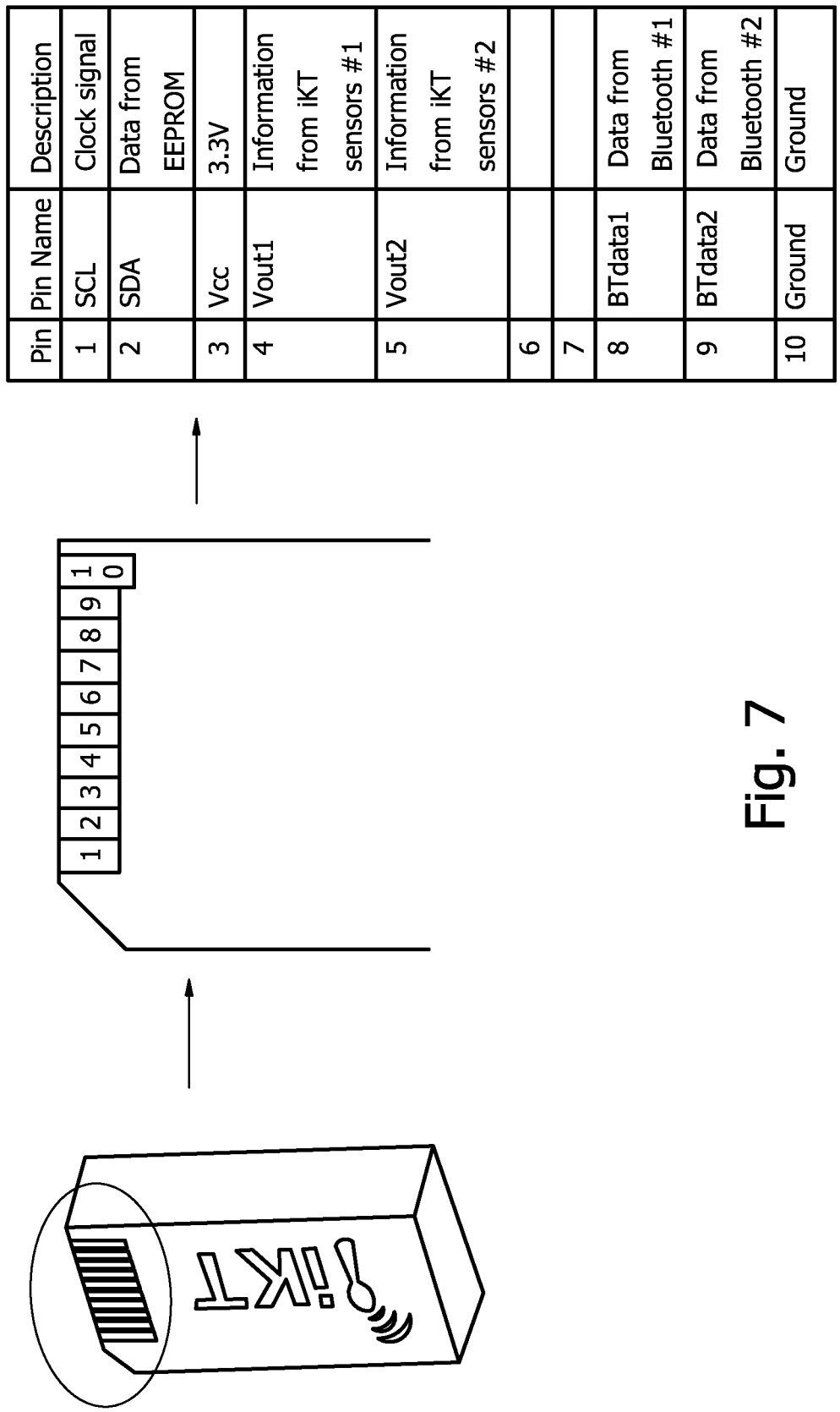
FIG. 7 is an illustration of the 10-pin processor on the universal electronic monitoring device used to complete the electric circuit within compatible apparatuses.

The circuit diagram of FIG. 4 discloses the 14 primary components of exemplified monitoring device's circuit from left to right: the Universal Serial Bus (USB) connector (1); the power charge (2); the power source—a 3.3 Volt battery (3); a switch (e.g. a reed switch) (4); a voltage regulator (5); a LED (6); a Bluetooth® module (7); a reset means (8); a microcontroller comprising an ISP programmer (9); an analog-to-digital converter (10); and the 10 pin connector on the outside of the monitoring device (11) (See FIG. 7 also). And the circuit within a compatible apparatus comprises: EEPROM chip (12); the controller, which is a function of the type of apparatus (13); and the Sensors (14).

In a preferred embodiment, the power source is via a 3.3 volt battery (3) that is rechargeable via a USB connector (1). Other power sources may be used with the monitoring device (100), as determined by the intended use and/or the location of the device (100). For example, a universal electronic monitoring device for use outdoors, such as a garden tool, may comprise a solar panel as a power source. One of ordinary skill in the art could readily modify the exemplified circuit of FIGS. 4-7 to be supplied with the appropriate type of power source.

One of ordinary skills in the art would know of other types of switches to activate the sensors and transmit data to the electronic monitoring device, such as leaf switches, proximity switches (capacitive, inductive), gravity-sensitive switch which senses the opening of the door, a mercury-type switch, a photo device which is actuated by the light entering the box when the door is opened or other suitable switch means, pressure switches (piezoelectric), and mechanical slide switches. In a preferred embodiment, the reed switch is activated by a magnet located within or upon the apparatus, wherein the magnet comes in close contact with the switch when the monitoring device (100) is inserted into the apparatus.

The universal electronic monitoring device may be used in a variety of venues for a variety of purposes. Therefore, the types of sensors (14) appropriate for use in the circuits of FIGS. 4-7 are determined by their function and power source requirements. For example, if the sensor measures weight (i.e. cooking ingredients), then the sensor may comprise a load cell with a 4 pin connection, while a sensor for measuring temperature may comprise a thermistor with a 2 pin connection.

FIG. 7 is an illustration of the 10-pin processor on the universal electronic monitoring device used to complete the electric circuit within compatible apparatuses. The pins comprise: a SCL—clock signal (1); a SDA—data from EEPROM chip (2); Vcc—3.3 Volt (3); Vout1—information from iKT sensors #1 (4); Vout2—information from iKT sensors #2 (5); BTdata1—data from Bluetooth chip #1 (6); BTdata2—data from Bluetooth chip #2 (7); and ground (10). The EEPROM chip (2) will provide the apparatus's function and unique identification number to the electronic monitoring device.

Additionally, the User's electronic communications device can act as a "control" device of the apparatuses by wirelessly transmitting commands to the universal electronic monitoring device, which subsequently transmits it to the sensors of the apparatus via the electronic circuit link between the two (10 pin processor).

Exemplification of Mixing Bowl

Figure 8A:
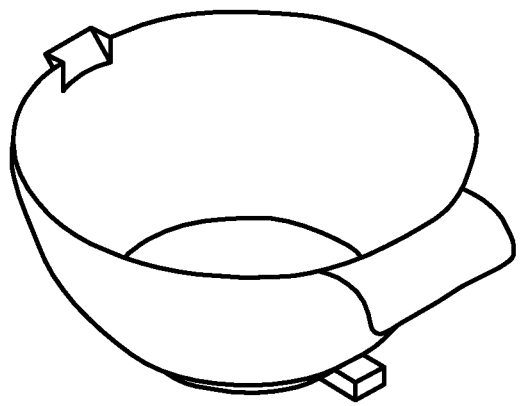
FIGS. 8A-E are illustrations of a variety of views of an exemplified mixing bowl comprising the sensor unit.
Figure 8B:
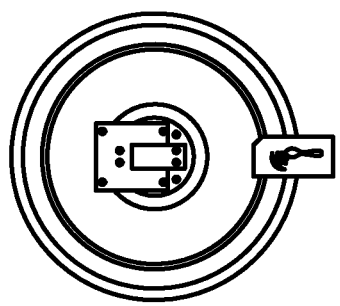
Figure 8C:
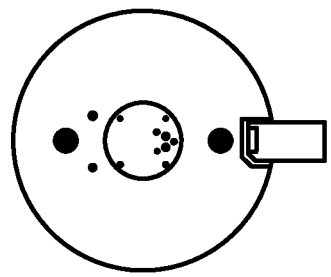
Figure 8D:
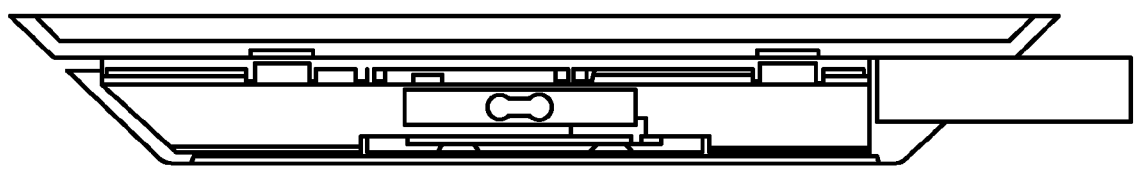
Figure 8E:
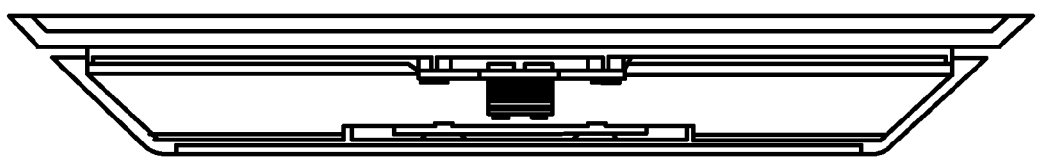

FIGS. 8A-E illustrate a preferred embodiment of the present invention comprising various views of a mixing bowl apparatus, with a sensor unit to detect the weight of food and ingredients within the bowl, and with a universal electronic monitoring device plugged into the base of the bowl. FIG. 8A is an isometric view of the bowl showing the monitoring device (i.e. iKT box) extending from the bowl's base. FIG. 8B is an overhead view of the base of the bowl comprising the weight sensor and monitoring device. FIG. 8C is an underside view of the same. FIG. 8D is a side view of the base of the bowl showing the sensor unit within the bowl and the monitoring device extending outside of the bowl. And FIG. 8E is a side view of the base of the bowl showing the end of the monitoring device inserted into the bowl base.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A universal electronic monitoring device to wirelessly transmit an apparatus's sensor data to a User's electronic communications device, comprising:
   a) a magnetic switch for triggering the monitoring device when inserted into a cooking apparatus and in the vicinity of a sensor unit housed within a cooking apparatus, wherein said sensor unit measures the apparatus's current conditions without analyzing the data, comprising temperature, weight, viscosity, liquid volume, pressure, gas, contact, and sound;
   b) a read and write memory comprising memory data;
   c) a means to connect to the sensor unit and to wirelessly transmit a raw data from the sensor unit to a microcontroller;
   d) a microcontroller to process the raw sensor data and the memory data, and convert the raw sensor data from analog-to-digital without analyzing said data;
   e) a Bluetooth® chip to wirelessly transmit the processed sensor and memory data from the microcontroller to a User's electronic communications device;
   f) a means to power and recharge the monitoring device; and, g) wherein said monitoring device is usable with two or more cooking apparatuses comprising preparation tools, oven tools, cooking gadgets, cooking tools, food containers, and kitchen and cooking appliances.

2. The device of claim 1, wherein said preparation tools comprise a mixing bowl, cutting board, cocktail shaker, sauce shaker, measuring jug and cup, and measuring spoons, and wherein said sensor unit detects the weight of food and cooking ingredients.

3. The device of claim 1, wherein said oven tools comprise a silicone mat, cake mold, and popup timers, and wherein said sensor unit detects the temperature of food.

4. The device of claim 1, wherein said cooking tools comprise a spatula, turner, basting spoon, slotted spoon, ladle, brush, and mini-slotted turner, and wherein said sensor unit detects the temperature of food.

5. The device of claim 1, wherein the User's electronic communications device computes food expiration date and quantity within said food container; and, b) the food container is an ice cube tray, wherein said sensor unit detects the temperature within a freezer.

6. The device of claim 1, wherein said gadgets comprise, a pizza cutter, a cheese grater, and ice cream scoop, and a whisk.

7. The device of claim 1, wherein said Bluetooth® chip within said monitoring device is configured for receiving processed data from said monitoring device's microcontroller, and transmitting said processed data to said User's electronic communications device.

8. The device of claim 7, further comprising means for wirelessly transmitting commands from said User's electronic communications device to said Bluetooth® chip, and wirelessly transmitting from said chip to said sensor unit to control the operation of said cooking apparatus.

9. The device of claim 8, wherein said apparatus comprises a coffee maker, oven, and refrigerator.

10. A wireless cooking apparatus monitoring system, comprising:
　a) two or more cooking apparatuses, each apparatus housing a sensor unit for monitoring one or more conditions within said apparatus comprising: temperature, weight, viscosity, liquid volume, pressure, gas, contact, and sound, wherein said sensor unit comprises an EEPROM card, a sensor, a magnet and a controller;
　b) one or more monitoring devices, wherein a monitoring device is inserted into said cooking apparatus to wirelessly transmit raw sensor data to an electronic communications device, said monitoring device comprising,
　　i) a switch activated by said sensor unit upon said monitoring device insertion into said cooking apparatus,
　　ii) a microcontroller to process the cooking apparatus's raw sensor data,
　　iii) a Bluetooth® chip to wirelessly transmit the processed sensor data from the monitoring device microcontroller to an electronic communications device; and,
　c) an electronic communications device comprising non-transitory computer readable medium containing computer executable instructions to wirelessly receive, store, analyze and display and/or emit an audio message comprising the sensor data from the one or more monitoring devices sequentially and/or simultaneously.

11. The system of claim 10, wherein the cooking apparatuses wirelessly transmits sensor data to the monitoring device and receives apparatus operating commands from the monitoring device.

12. The system of claim 10, further comprising within said electronic communication device, non-transitory computer readable medium containing computer executable instructions to transmit apparatus operating commands to said monitoring device.

13. The system of claim 10, further comprising within said electronic communication device, non-transitory computer readable medium containing computer executable instructions to display information comprising apparatus utilization tips and cooking recipes.

14. A method of use of a universal electronic monitoring device in cooking, wherein the monitoring device comprises an electric circuit comprising a magnetic switch, a microcontroller, and a Bluetooth® chip to wirelessly transmit data between a cooking apparatus's sensor unit and a User's electronic communications device, comprising the steps of:
　a) inserting said monitoring device into said cooking apparatus, wherein said cooking apparatus's sensor unit and said monitoring device's electric circuit connect to activate said magnetic switch;
　b) receiving and processing apparatus sensor unit raw data by the monitoring device's microcontroller;
　c) transmitting processed sensor unit data from said microcontroller to the monitoring device's Bluetooth® chip;
　d) wirelessly transmitting processed sensor unit data from said Bluetooth® chip to a User's electronic communications device, wherein said sensor unit data is analyzed, stored and displayed and/or an audio message is emitted;
　e) wherein said monitoring device is simultaneously and/or sequentially used with two or more different types of cooking apparatuses comprising preparation tools, oven tools, cooking gadgets, cooking tools, food containers, kitchen and cooking appliances; and,
　f) wherein said sensor units monitor one or more conditions within each apparatus comprising: temperature, weight, viscosity, liquid volume, pressure, gas, contact, and sound.

15. The method of use of claim 14, further comprising wirelessly transmitting apparatus control commands to said monitoring device from said User's device, wherein said monitoring device subsequently transmits said commands to said apparatus's sensor unit.

* * * * *